US 11,655,194 B2

(12) United States Patent
Luthra et al.

(10) Patent No.: US 11,655,194 B2
(45) Date of Patent: May 23, 2023

(54) CERAMIC COMPOSITES WITH AN INTERMEDIATE LAYER HAVING A CARBON SINK MATERIAL FOR HIGH TEMPERATURE APPLICATIONS

(71) Applicant: General Electric Company, Schenectady, NY (US)

(72) Inventors: Krishan Lal Luthra, Schenectady, NY (US); Glen Harold Kirby, Liberty Township, OH (US); Julin Wan, Rexford, NY (US); Larry Steven Rosenzweig, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 751 days.

(21) Appl. No.: 16/655,626

(22) Filed: Oct. 17, 2019

(65) Prior Publication Data
US 2021/0114944 A1     Apr. 22, 2021

(51) Int. Cl.
| | | |
|---|---|---|
| *C04B 41/00* | (2006.01) | |
| *C04B 35/80* | (2006.01) | |
| *C04B 41/50* | (2006.01) | |
| *C04B 41/52* | (2006.01) | |

(52) U.S. Cl.
CPC .......... *C04B 41/009* (2013.01); *C04B 35/80* (2013.01); *C04B 41/5057* (2013.01); *C04B 41/5059* (2013.01); *C04B 41/5071* (2013.01); *C04B 41/522* (2013.01); *C04B 2235/3826* (2013.01); *C04B 2235/5244* (2013.01)

(58) Field of Classification Search
None
See application file for complete search history.

(56) References Cited

U.S. PATENT DOCUMENTS

| | | |
|---|---|---|
| 3,992,200 A | 11/1976 | Chandhok |
| 4,744,943 A | 5/1988 | Timm |
| 4,859,525 A | 8/1989 | Hench et al. |
| 5,051,218 A | 9/1991 | Matthews |
| 5,612,264 A | 3/1997 | Nilsson et al. |
| 5,681,783 A | 10/1997 | Nilsson et al. |
| 5,855,967 A | 1/1999 | Kirkpatrick |
| 5,874,175 A | 2/1999 | Li |
| 6,254,975 B1 | 7/2001 | Kayser et al. |
| 6,347,446 B1 | 2/2002 | Luthra et al. |
| 6,676,887 B2 | 1/2004 | Lafdi |
| 7,115,319 B2 | 10/2006 | Raybould et al. |
| 9,085,991 B2 | 7/2015 | Golecki |
| 9,275,762 B2 | 3/2016 | Garnier et al. |
| 10,093,810 B2 | 10/2018 | Wan et al. |

(Continued)

FOREIGN PATENT DOCUMENTS

| | | | |
|---|---|---|---|
| CN | 102417375 A | 4/2012 | |
| CN | 103540936 A | 1/2014 | |
| JP | 07069763 A | * 3/1995 | ........... C04B 41/009 |

*Primary Examiner* — David Sample
(74) *Attorney, Agent, or Firm* — Dority & Manning, P.A.

(57) ABSTRACT

Coated components, along with methods of their formation, are provided. The coated component includes a ceramic substrate having a surface; an intermediate layer on the surface of the ceramic substrate; and an environmental barrier coating on the intermediate layer. The intermediate layer includes a carbon-sink material that inhibits accumulation of free carbon from a carbon-containing species within the intermediate layer, the ceramic substrate, or both.

19 Claims, 1 Drawing Sheet

(56) References Cited

U.S. PATENT DOCUMENTS

| | | |
|---|---|---|
| 10,260,139 B2 | 4/2019 | Cybulsky et al. |
| 10,329,205 B2 | 6/2019 | Landwehr et al. |
| 10,822,998 B2 | 11/2020 | Luthra et al. |
| 2002/0025454 A1 | 2/2002 | Wang et al. |
| 2009/0155554 A1 | 6/2009 | Gentleman et al. |
| 2014/0272344 A1* | 9/2014 | Wan ................. C04B 41/009 427/419.7 |
| 2016/0215631 A1 | 7/2016 | Wan |
| 2016/0229757 A1 | 8/2016 | McCaffrey et al. |
| 2016/0273088 A1* | 9/2016 | Cybulsky ............ C04B 41/52 |
| 2017/0073277 A1 | 3/2017 | Shim et al. |
| 2018/0222807 A1* | 8/2018 | Shim .............. C04B 41/5001 |
| 2019/0161416 A1 | 5/2019 | Luthra |

* cited by examiner

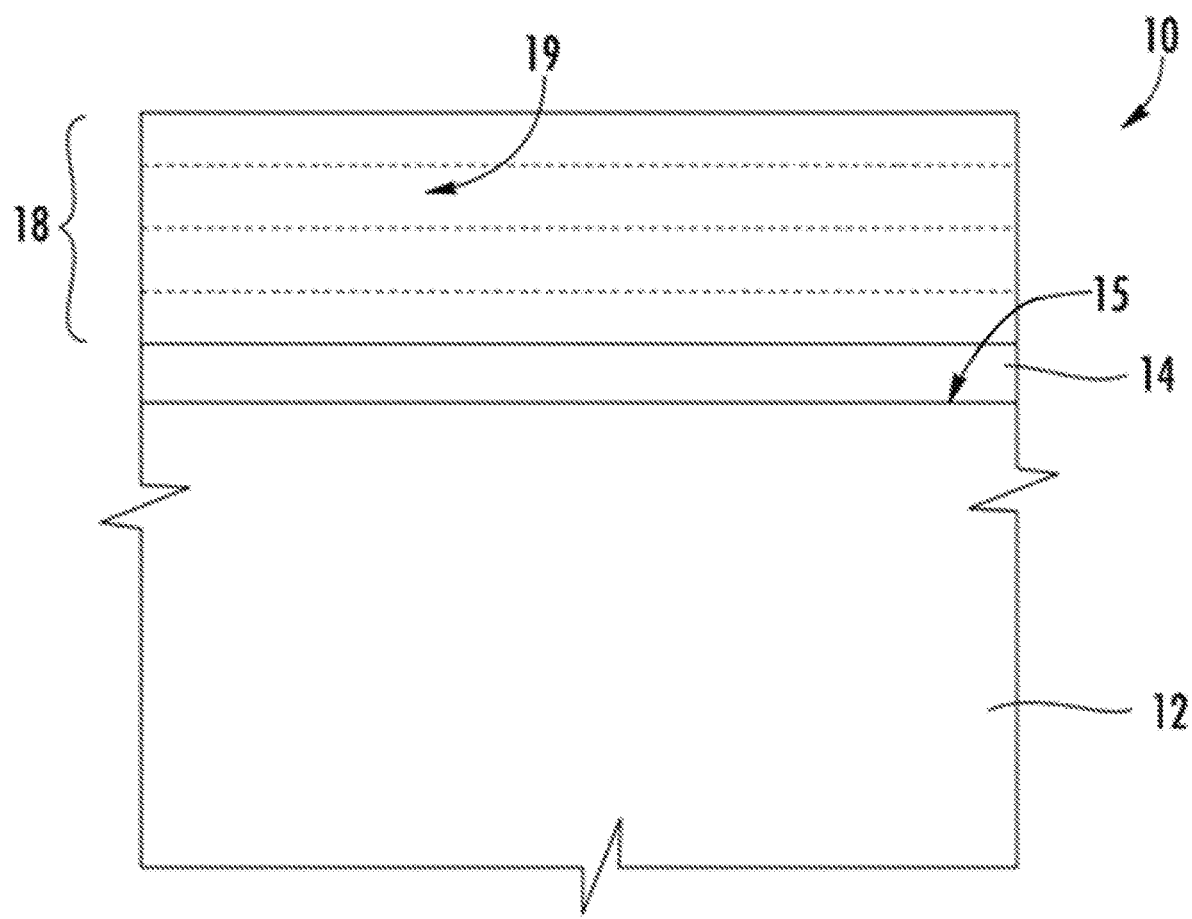

CERAMIC COMPOSITES WITH AN INTERMEDIATE LAYER HAVING A CARBON SINK MATERIAL FOR HIGH TEMPERATURE APPLICATIONS

FIELD

The present invention generally relates to the use of environmental barrier coatings on ceramic components, along with methods of their formation and use.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide protection against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials, including SiC fiber reinforced SiC matrix (SiC/SiC) composites.

Currently, EBC materials are made out of rare earth silicate compounds. These materials seal out water vapor, preventing it from reaching the silicon oxide scale on the silicon carbide or silicon nitride surface, thereby preventing recession. Such materials cannot prevent oxygen penetration, however, which results in oxidation of the underlying substrate. Oxidation of the substrate yields a passive silicon oxide scale, along with the release of carbonaceous or nitrous oxide gas. The carbonaceous (i.e., $CO$, $CO_2$) or nitrous (i.e., $NO$, $NO_2$, etc.) oxide gases cannot escape out through the dense EBC and thus, blisters form. The use of a silicon bond coating has been the solution to this blistering problem to date. The silicon bond coating provides a layer that oxidizes (forming a passive silicon oxide layer beneath the EBC) without liberating a gaseous by-product.

However, the presence of a silicon bond coating limits the upper temperature of operation for the EBC because the melting point of silicon metal is relatively low. In use, the silicon bond coating melts at coating temperatures of about 1414° C., which is the melting point of silicon metal. Above these melting temperatures, the silicon bond coating may delaminate from the underlying substrate, effectively removing the bond coat and the EBC thereon. As such, it is desirable to obviate the need for a silicon bond coating in the EBC to achieve a higher operational temperature limit for the EBC.

BRIEF DESCRIPTION

Aspects and advantages of the invention will be set forth in part in the following description, or may be obvious from the description, or may be learned through practice of the invention.

Coated components are generally provided, along with methods of their formation. In one embodiment, the coated component may include a ceramic substrate having a surface; an intermediate layer on the surface of the ceramic substrate; and an environmental barrier coating on the intermediate layer. For example, the intermediate layer may include a carbon-sink material that inhibits accumulation of free carbon from a carbon-containing species within the intermediate layer, the ceramic substrate, or both.

In one embodiment, the method of coating a ceramic component on its outer surface, where the ceramic component comprises silicon carbide, may include forming an intermediate layer on the outer surface of the ceramic component and forming an environmental barrier coating on the intermediate layer. For example, the intermediate layer may include a carbon-sink material that inhibits accumulation of free carbon from a carbon-containing species within the intermediate layer, the ceramic substrate, or both These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 1 is a schematic cross-sectional view of an exemplary coated component having a ceramic substrate formed with an intermediate layer applied onto a ceramic core.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "rare earth elements" encompass the elements scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

A coated component is generally provided that includes a ceramic substrate having an intermediate layer to tailor its surface's properties such that an environmental barrier coating (EBC) may be coated directly thereon without a silicon bond coating therebetween. For example, the intermediate layer may include a carbon-sink material underlying the EBC to keep the carbon activity below that required to form carbon oxides (e.g., CO and/or $CO_2$) gas bubbles upon exposure to oxygen at operational temperatures. In particular embodiments, the carbon-sink material inhibits and/or prevents accumulation of free carbon from a carbon-containing species within the intermediate layer, the ceramic substrate, or both by reacting with any such free carbon as it is formed. As such, the amount of free carbon is diminished, or eliminated, from the surface of the ceramic substrate and/or the intermediate layer such that carbon oxides are inhibited, or prevented, from formation.

FIG. 1 shows an exemplary embodiment of exemplary coated component 10 including a ceramic substrate 12 having an intermediate layer 14 over its surface 15. The intermediate layer 14 generally includes a carbon-sink material, such as discussed below in greater detail. As shown, the intermediate layer 14 is directly on the surface 15 of the ceramic substrate 12, without any intervening layers therebetween, so as to be free from a bond coating (e.g., a silicon bond coating). An environmental barrier coating 18 is on the intermediate layer 14.

Generally, the ceramic substrate 12 may be formed from a ceramic matrix composite ("CMC") material, such as a silicon-based, non-oxide ceramic matrix composite. As used herein, "CMC" refers to a silicon-containing, matrix and reinforcing material. As used herein, "monolithic ceramics" refers to materials without fiber reinforcement (e.g., having the matrix material only). Herein, CMCs and monolithic ceramics are collectively referred to as "ceramics." In one particular embodiment, the CMC includes a material having a matrix and/or reinforcing fibers comprising silicon carbide. Examples include, but are not limited to, CMCs with silicon carbide matrix and silicon carbide fiber; silicon nitride matrix and silicon carbide fiber; and silicon carbide/silicon nitride matrix mixture and silicon carbide fiber.

As stated, the intermediate layer 14 is an applied layer on the surface 15 of the ceramic substrate 12, which may be formed by any suitable deposition technique, and includes a carbon-sink material therein. In one embodiment, the carbon-sink material of the intermediate layer 14 includes one or more carbides that react to form another carbide with a lower ratio of the carbiding element to carbon upon exposure to free carbon at temperatures encountered during operation of the coated component. For example, ditungsten carbide ($W_2C$), dimolybdenum carbide ($Mo_2C$), diniobium carbide ($Nb_2C$), ditantalum carbide ($Ta_2C$), or a mixture thereof may be used as a carbide within the intermediate layer 14 such that, upon reaction with carbon, reacts to form, respectively, tungsten carbide (WC), molybdenum carbide (MoC), niobium carbide (NbC), tantalum carbide (TaC), or a mixture thereof.

In one embodiment, for instance, $W_2C$ may react with free carbon to be converted to tungsten carbide (WC) upon exposure to free carbon through the reaction:

$$W_2C + 2C \rightarrow 2WC$$

at operational temperatures where the free carbon would react with oxygen to form carbon oxides (e.g., reaction temperatures). Similarly, dimolybdenum carbide ($Mo_2C$) may react with free carbon to be converted to molybdenum carbide (MoC) upon exposure to free carbon through the reaction:

$$Mo_2C + 2C \rightarrow 2MoC$$

at operational temperatures where the free carbon would react with oxygen to form carbon oxides. Similarly, diniobium carbide ($Nb_2C$) and ditantalum carbide ($Ta_2C$) may be reduced, via reaction with carbon, to niobium carbide (NbC) and tantalum carbide (TaC), respectively.

In another embodiment, the intermediate layer 14 may include a carbon-sink material that has a relatively large non-stoichiometry and/or a rapid carbon diffusivity. For example, the carbon-sink material of the intermediate layer 14 may include a phase having a relatively large range of non-stoichiometry, meaning that the phase under thermodynamic equilibrium conditions exists over a relatively large range of carbon concentration compared to the non-stoichiometry range of silicon carbide. For example, the carbon-sink material of the intermediate layer 14 may include one or more carbides that exist over a relatively large non-stoichiometric range. Carbides are an example of a phase that can exist over some non-stoichiometry ranges. Some have very small non-stoichiometry range. For example, silicon carbide exists over a very narrow range of carbon content, (i.e., carbon to silicon ratio very close to unity, i.e., 1:1), and a small deviation from stoichiometry leads to a second phase of silicon or carbon. On the other hand, TiC can exist over a comparatively broad carbon concentration range, even though the standard stoichiometric formula indicates a carbon to titanium ratio of unity. For example, depending on the temperature, the titanium:carbon ratio in TiC can range from 1:1 to 2:1. In such cases, TiC with a high Ti/C ratio (e.g., the carbon-deficient carbide, such as a Ti:C ratio that is greater than 1:1 to 2:1, such as about 1.5:1 to 2:1) can be used as sink, assuming that the diffusivity of carbon within the selected carbide phase is sufficiently high to avoid undue accumulation of carbon before a desired service life of the component is reached. Examples of carbides having large ranges of non-stoichiometry relative to silicon carbide include TaC, NbC, HfC, and ZrC.

The carbon-sink material (e.g., any of the materials discussed above) may be dispersed, in certain embodiments, within silicon carbide (SiC) serving as a matrix material. For example, the intermediate layer 14 may include silicon carbide with the different carbide dispersed therein, where the different carbide converts to a higher carbide upon exposure to free carbon (e.g., $W_2C$, $Mo_2C$, etc.). In such an embodiment, the intermediate layer 14 may include a sufficient amount of the different carbide to adsorb free carbon generated from the ceramic substrate 12 and/or the intermediate layer 14 itself. For example, the intermediate layer 14 may include about 50% to about 99%, by weight, of SiC, and may include about 1% to about 50% by weight of the different carbide.

In still another embodiment, the carbon-sink material of the intermediate layer 14 may include a carbon getter that reacts with free carbon to form a carbide. For example, the carbon-sink material may include a carbon getter dispersed within SiC. The carbon getter may, in one embodiment, include a metal, such as molybdenum, tungsten, niobium, tantalum, titanium, zirconium, hafnium, or a mixture thereof. For example, upon exposure to free carbon at elevated temperatures encountered during operation of the coated component, Mo included within the intermediate layer 14 may form a molybdenum carbide (e.g., MoC and/or $Mo_2C$). Similarly, W included within the intermediate layer 14 may form a tungsten carbide (e.g., WC and/or $W_2C$) at elevated temperatures encountered during operation of the coated component. Silicides may also be included as the carbon getter, such as $ZrSi_2$, $HfSi_2$, $TiSi_2$, or a mixture thereof. Such silicides would getter carbon, and in some cases can also be used for gettering carbon oxides that might be generated at the interface between intermediate layer 14 and EBC 18. In some embodiment, this getter layer may be porous, which may allow carbon oxides to diffuse in the getter layer comprising silicides and react with them.

The intermediate layer 14 may have a thickness sufficient to protect the underlying ceramic substrate 12 from undesired oxidation, such as about 1 μm to about 250 μm (e.g., about 1 μm to about 100 μm).

No matter the configuration of the intermediate layer 14, an EBC 18 is formed over the ceramic substrate 12 to form the coated component 10 with an increased maximum operating temperature if compared to a similar component using a silicon bond coating. The EBC 18 may include any combination of one or more layers formed from materials selected from typical EBC or thermal barrier coating ("TBC") layer chemistries, including but not limited to rare earth silicates (e.g., mono-silicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc. The EBC 18 may be formed from a plurality of individual layers 19 having different chemistries to be directed at different types of layers that work together to protect the underlying ceramic substrate 12.

The coated components 10 of FIG. 1 are particularly suitable for use as a component found in high temperature environments, such as those present in gas turbine engines, for example, combustor components, turbine blades, shrouds, nozzles, heat shields, and vanes. In particular, the turbine component can be a CMC component positioned within a hot gas flow path of the gas turbine such that the environmental barrier coating 18 protects the underlying ceramic substrate 12 within the gas turbine when exposed to the hot gas flow path. For example, such components may be expected to reach temperatures during operation of greater than 1200° C., and indeed in advanced designs may reach temperatures of up to 1500° C. or more.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component comprising:
a ceramic substrate having a surface;
an intermediate layer directly on the surface of the ceramic substrate, wherein the intermediate layer comprises 50% to 99%, by weight of silicon carbide and a carbon-sink material dispersed within the silicon carbide, wherein the carbon-sink material inhibits accumulation of free carbon from a carbon-containing species within the intermediate layer, the ceramic substrate, or both; and
an environmental barrier coating on the intermediate layer.

2. The coated component as in claim 1, wherein the ceramic substrate comprises silicon carbide.

3. The coated component as in claim 1, wherein the ceramic substrate comprises a silicon carbide matrix and silicon carbide fiber.

4. The coated component as in claim 1, wherein the carbon-sink material comprises one or more carbides that react to form another carbide with a lower ratio of a carbiding element to carbon upon exposure to free carbon at a reaction temperature.

5. The coated component as in claim 4, wherein the one or more carbides comprise ditungsten carbide, dimolybdenum carbide, diniobium carbide, ditantalum carbide, or a mixture thereof such that, upon reaction with carbon, react to form, respectively, tungsten carbide, molybdenum carbide, niobium carbide, tantalum carbide, or a mixture thereof.

6. The coated component as in claim 1, wherein the carbon-sink material comprises a carbide that has a non-stoichiometry allowing the carbide to convert to a second carbide upon exposure to carbon.

7. The coated component as in claim 6, wherein the carbide of the carbon-sink material comprises TiC a having a Ti:C ratio that is greater than 1:1 to 2:1.

8. The coated component as in claim 1, wherein the carbon-sink material comprises a carbon getter.

9. The coated component as in claim 8, wherein the intermediate layer comprises the carbon getter dispersed within the silicon carbide.

10. The coated component as in claim 8, wherein the carbon getter comprises a metal.

11. The coated component as in claim 10, wherein the metal comprises molybdenum, tungsten, niobium, tantalum, titanium, zirconium, hafnium, or a mixture thereof.

12. The coated component as in claim 8, wherein the carbon getter comprises a silicide.

13. The coated component as in claim 12, wherein the carbon getter forms a porous intermediate layer.

14. The coated component as in claim 1, wherein the intermediate layer has a thickness of about 1 μm to about 250 μm.

15. A method of coating a ceramic component on its outer surface, wherein the ceramic component comprises silicon carbide, the method comprising:
  forming an intermediate layer directly on the outer surface of the ceramic component, wherein the intermediate layer comprises 50% to 99%, by weight of silicon carbide and a carbon-sink material dispersed within the silicon carbide, wherein the carbon-sink material inhibits accumulation of free carbon from a carbon-containing species within the intermediate layer, the ceramic component, or both; and
  forming an environmental barrier coating on the intermediate layer.

16. The method of claim 15, wherein the carbon-sink material comprises a carbide that reacts to form another carbide with a lower ratio of a carbiding element to carbon upon exposure to free carbon at a reaction temperature.

17. The method of claim 15, wherein the carbon-sink material comprises a carbide that has a non-stoichiometry allowing the carbide to convert to another carbide upon exposure to carbon.

18. The method of claim 15, wherein the intermediate layer comprises a carbon getter dispersed within the silicon carbide.

19. The method of claim 17, wherein the carbide of the carbon-sink material comprises TiC a having a Ti:C ratio that is greater than 1:1 to 2:1.

* * * * *